(12) United States Patent
Young et al.

(10) Patent No.: US 7,667,854 B2
(45) Date of Patent: Feb. 23, 2010

(54) HAND-HELD SURVEY PROBE

(75) Inventors: Kevin L. Young, Idaho Falls, ID (US); Kevin E. Hungate, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 403 days.

(21) Appl. No.: 11/612,023

(22) Filed: Dec. 18, 2006

(65) Prior Publication Data
US 2008/0144046 A1  Jun. 19, 2008

(51) Int. Cl.
*G01B 11/14* (2006.01)
*G01P 3/36* (2006.01)
*G01R 29/12* (2006.01)

(52) U.S. Cl. .................. 356/614; 356/27; 356/71; 356/72; 250/208.1; 250/363.02; 250/559.33; 324/750; 324/753

(58) Field of Classification Search ................ 356/614, 356/71–73, 318–319, 394; 250/363.02, 363.1, 250/227.17, 227.26, 227.28, 559.33; 324/204, 324/202, 750, 753; 73/649, 23.2, 23.3, 632; 340/603, 541, 825.34
See application file for complete search history.

(56) References Cited

U.S. PATENT DOCUMENTS

| | | | | |
|---|---|---|---|---|
| 4,574,199 A * | 3/1986 | Pryor | ............. | 250/559.33 |
| 5,286,973 A * | 2/1994 | Westrom et al. | ............. | 250/253 |
| 5,504,569 A | 4/1996 | Kato et al. | | |
| 5,592,101 A * | 1/1997 | Takahashi et al. | ............. | 324/753 |
| 5,675,249 A * | 10/1997 | LaClair | ............. | 324/204 |
| 5,732,704 A * | 3/1998 | Thurston et al. | ............. | 600/431 |
| 5,762,609 A * | 6/1998 | Benaron et al. | ............. | 600/473 |
| 6,242,741 B1 * | 6/2001 | Miller et al. | ............. | 250/363.02 |
| 6,490,030 B1 * | 12/2002 | Gill et al. | ............. | 356/71 |
| 6,837,095 B2 * | 1/2005 | Sunshine et al. | ............. | 73/23.2 |
| 7,022,998 B2 * | 4/2006 | Lightfoot et al. | ............. | 250/394 |
| 7,165,015 B2 * | 1/2007 | Roberts | ............. | 702/188 |
| 7,186,963 B2 * | 3/2007 | Hughes et al. | ............. | 250/208.1 |
| 7,227,623 B2 * | 6/2007 | Buchmann et al. | ............. | 356/72 |
| 2002/0163495 A1 | 11/2002 | Doynov | | |
| 2002/0175291 A1 | 11/2002 | Reeder et al. | | |
| 2005/0193820 A1 * | 9/2005 | Sheljaskow et al. | ............. | 73/649 |

OTHER PUBLICATIONS

International Preliminary Report on Patentability and Written Opinion of the International Searching Authority for PCT/US07/077604, dated Sep. 22, 2008, 8 pages.

* cited by examiner

*Primary Examiner*—Sang Nguyen
(74) *Attorney, Agent, or Firm*—TraskBritt, PC

(57) ABSTRACT

A system for providing operational feedback to a user of a detection probe may include an optical sensor to generate data corresponding to a position of the detection probe with respect to a surface; a microprocessor to receive the data; a software medium having code to process the data with the microprocessor and pre-programmed parameters, and making a comparison of the data to the parameters; and an indicator device to indicate results of the comparison. A method of providing operational feedback to a user of a detection probe may include generating output data with an optical sensor corresponding to the relative position with respect to a surface; processing the output data, including comparing the output data to pre-programmed parameters; and indicating results of the comparison.

45 Claims, 13 Drawing Sheets

US 7,667,854 B2

HAND-HELD SURVEY PROBE

GOVERNMENT RIGHTS

This invention was made with United States Government support under Contract No. DE-AC07-05ID1457 awarded by United States Department of Energy. The United States Government has certain rights in the invention.

TECHNICAL FIELD

This invention relates to survey probes in general and, more specifically, to survey probes that are configured to provide increased accuracy during use.

BACKGROUND OF THE INVENTION

The use of a hand-held survey or detection probe to survey oneself, or another surface, is commonly referred to as "frisking". One error committed by radiation workers and emergency responders when using a hand-held detection or survey probe to frisk, e.g., survey for radiation, is moving the probe too quickly over the surface. This problem is often referred to as "turbo-frisking". Such an error may allow dangerous radioactive contamination to go undetected because the probe did not have adequate time over the contaminated area to detect the radiation present.

Another error committed while frisking, e.g., surveying for radioactive contamination, is not holding the probe close enough to the surface being surveyed to adequately detect potential contamination. This type of error often occurs when surveying for alpha radiation due to the relatively short travel distance of alpha particles. This error may also occur when surveying for beta radiation.

Still another problem encountered when surveying is accidentally contacting the surface with the survey probe. Such accidental contact may transfer radioactive contamination to the probe, which generally causes all future readings to be in error.

Typically, radiation workers and emergency responders are trained to maintain a proper probe speed and distance while surveying for radioactive contamination. Currently, there is no automated device that provides accurate feedback to the operator with respect to proper survey speed and probe distance.

SUMMARY OF THE INVENTION

A monitoring system for providing operational feedback to a user of a detection probe may include an optical sensor in attachment to the detection probe, the optical sensor being configured to generate output data corresponding to a position of the detection probe with respect to a surface; a microprocessor in communication with the optical sensor, the microprocessor being configured to receive the output data corresponding to the position of the detection probe; a software medium, the software medium having code to process the output data with the microprocessor and the code having pre-programmed parameters and being configured to make a comparison of the output data to the pre-programmed parameters; and an indicator device in communication with the microprocessor, the indicator device being configured to indicate a result of the comparison of the output data to the pre-programmed parameters.

In various other embodiments, the pre-processed parameters may comprise a maximum velocity standard, a minimum distance standard or a maximum distance standard.

In still other embodiments, the indicator device may comprise an excess velocity indicator, a normal velocity indicator, a minimum distance indicator, a maximum distance indicator, or a contact indicator.

In another embodiment, an apparatus may comprise a hand-held radiation detection probe; an optical sensor operatively associated with the hand-held radiation detection probe, the optical sensor being configured to generate output data corresponding to a position with respect to a surface; a microprocessor in communication with the optical sensor, the microprocessor being configured to receive the output data; a software medium, the software medium having code to process the output data with the microprocessor, and the code having pre-programmed parameters and being configured to make a comparison of the output data to the pre-programmed parameters; and an indicator device in communication with the microprocessor, the indicator device being configured to indicate a result of the comparison of the output data to the pre-programmed parameters.

In yet another embodiment, there is provided a method of providing operational feedback to a user of a detection probe, comprising generating output data with an optical sensor, the output data corresponding to a position of the detection probe with respect to a surface; processing the output data, including comparing the output data to pre-programmed parameters; and indicating a result from comparing the output data to the pre-programmed parameters.

BRIEF DESCRIPTION OF THE DRAWINGS

Illustrative embodiments of the invention are shown in the drawings in which.

DETAILED DESCRIPTION

Figure 1:
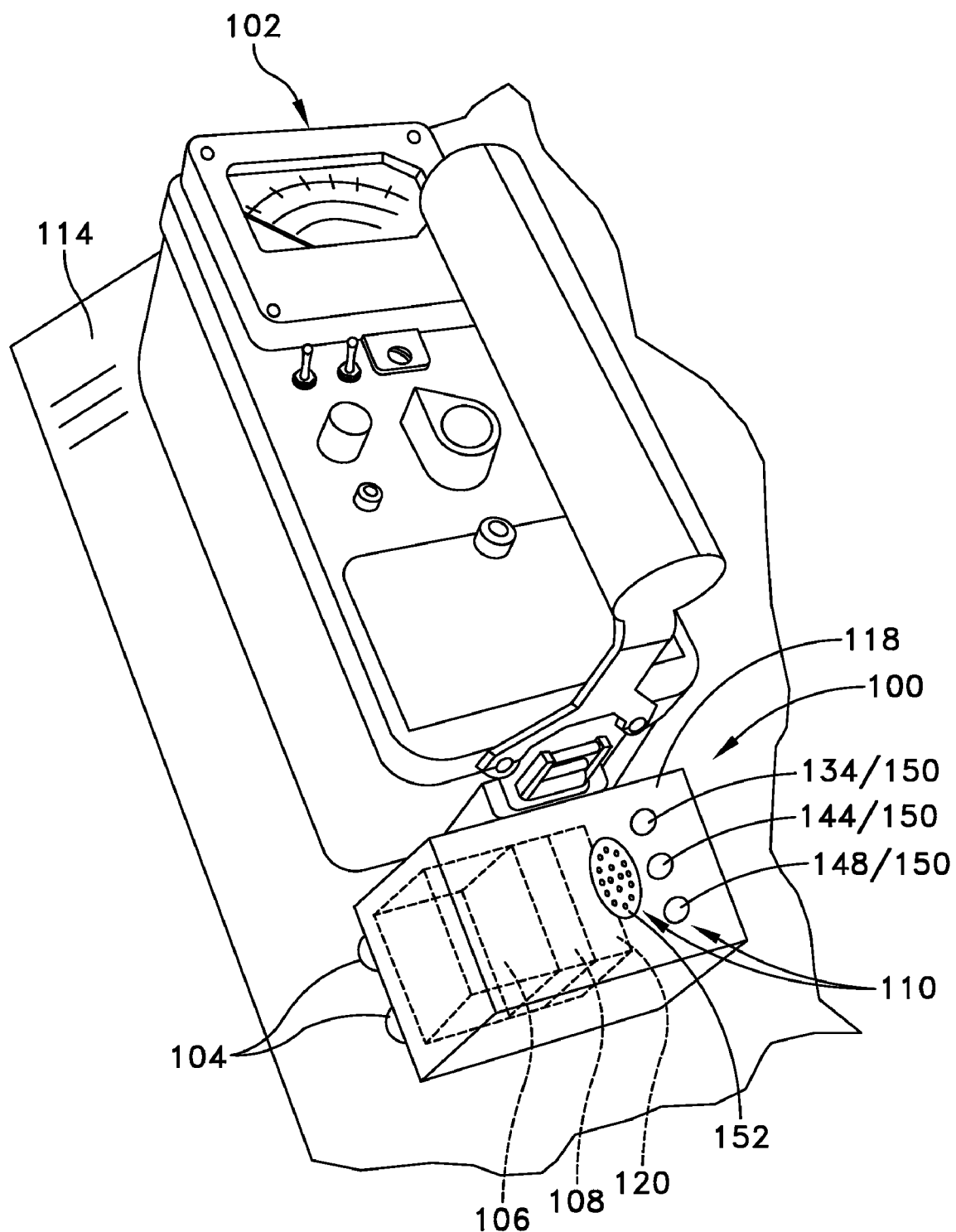
FIG. 1 illustrates an embodiment of a monitoring system for providing operational feedback to a user of a hand-held radiation detection probe.

FIG. 1 shows an embodiment of monitoring system 100 for providing operational feedback to a user of a survey or detection probe, such as, for example, hand-held radiation detection probe 102. Alternatively, the monitoring system 100 may be used in conjunction with any type of survey or detection probe (e.g., not necessarily a radiation detection probe) wherein the speed and distance-from-surface of the probe is desired for measurement or operation. Monitoring system 100 may include an optical sensor 104, a microprocessor 106, as shown by dashed lines, a software medium having code 108, as shown by dashed lines, and an indicator device 110. Optical sensor 104 may be attached to hand-held radiation detection probe 102. Optical sensor 104 may be configured to generate output data 112 (FIG. 7), corresponding to a relative position of hand-held radiation detection probe 102 with respect to a surface 114.

Microprocessor 106 may communicate with optical sensor 104. Microprocessor 106 may be configured to receive output data 112 corresponding to the relative position of hand-held radiation detection probe 102 with respect to surface 114. Code 108 may be configured to process output data 112 with microprocessor 106. Code 108 may have pre-programmed parameters 116 (see FIG. 7) for proper use of hand-held radiation detection probe 102. Alternatively, pre-programmed parameters 116 may be based on any desired set of operating, testing, or other conditions for use of hand-held radiation detection probe 102. Code 108 may be configured to compare output data 112 to pre-programmed parameters 116. Indicator device 110 may communicate with microprocessor 106. Indicator device 110 may be configured to indicate at least one result from comparing output data 112 to pre-programmed parameters 116.

FIGS. 1-5 show a housing 118. A connector 119 may be provided for attaching housing 118 to hand-held radiation detection probe 102. Housing 118 may be an aftermarket retrofit device for one or more types of probes or a modular component of an originally manufactured probe. Housing 118 may include optical sensor 104, microprocessor 106, code 108, and indicator device 110. Generally, housing 118 may be attached to hand-held radiation detection probe 102 in any manner as would be familiar to one of ordinary skill in the art.

Figure 2:
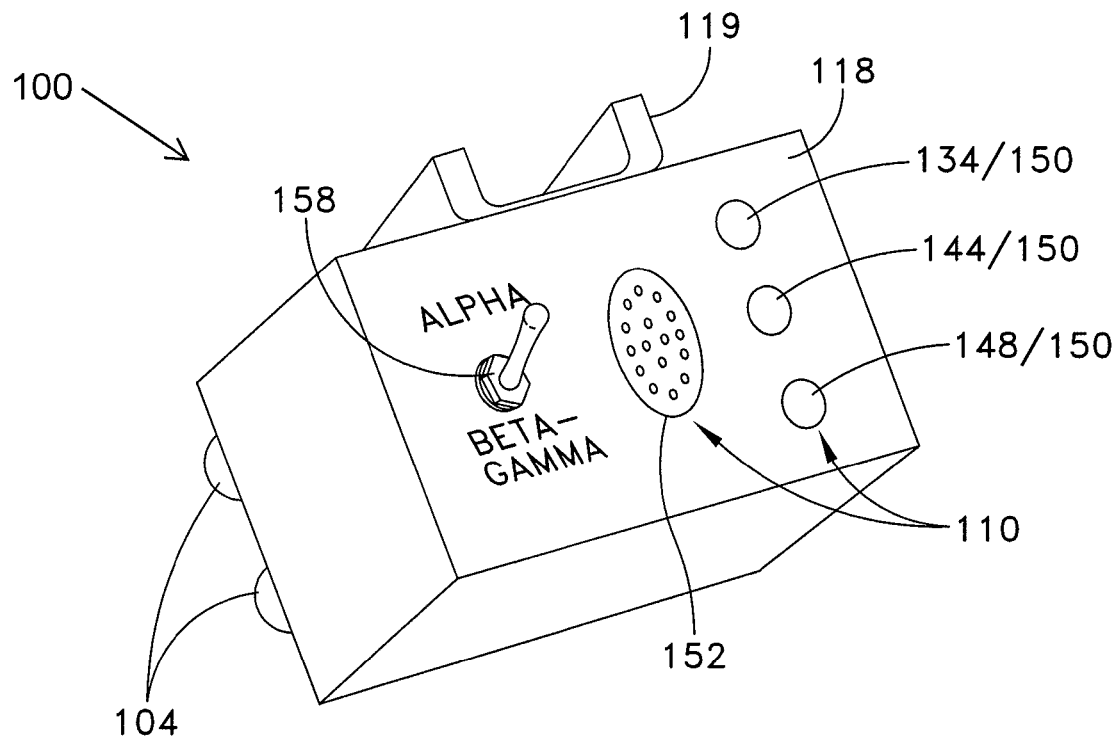
FIG. 2 is a frontal view of the monitoring system shown in FIG. 1.
Figure 3:
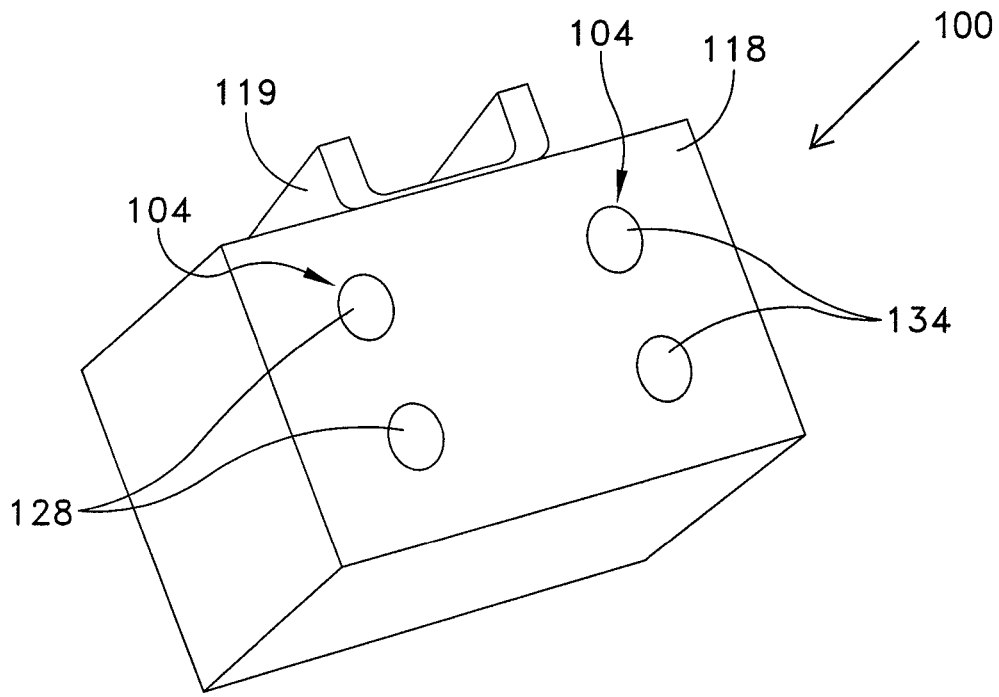
FIG. 3 is a back view of the monitoring system shown in FIG. 1.

FIG. 2 illustrates a frontal view of monitoring system 100 shown in FIG. 1 with connector 119 disconnected from hand-held radiation detection probe 102. FIG. 3 illustrates a back view of monitoring system 100 shown in FIGS. 1 and 2. In FIG. 5, housing 118 is shown mounted to a forward portion of hand-held radiation detection probe 102. However, it should be appreciated that housing 118 may be configured for mounting on various sides of hand-held radiation detection probe 102, including, but not limited to, the bottom or side portions. For example, such attachment could be achieved by mounting housing 118 on the hand-held radiation detection probe 102 or by connecting the housing 118 to the hand-held radiation detection probe 102 using cable 109 as shown in FIG. 4.

Figure 4:
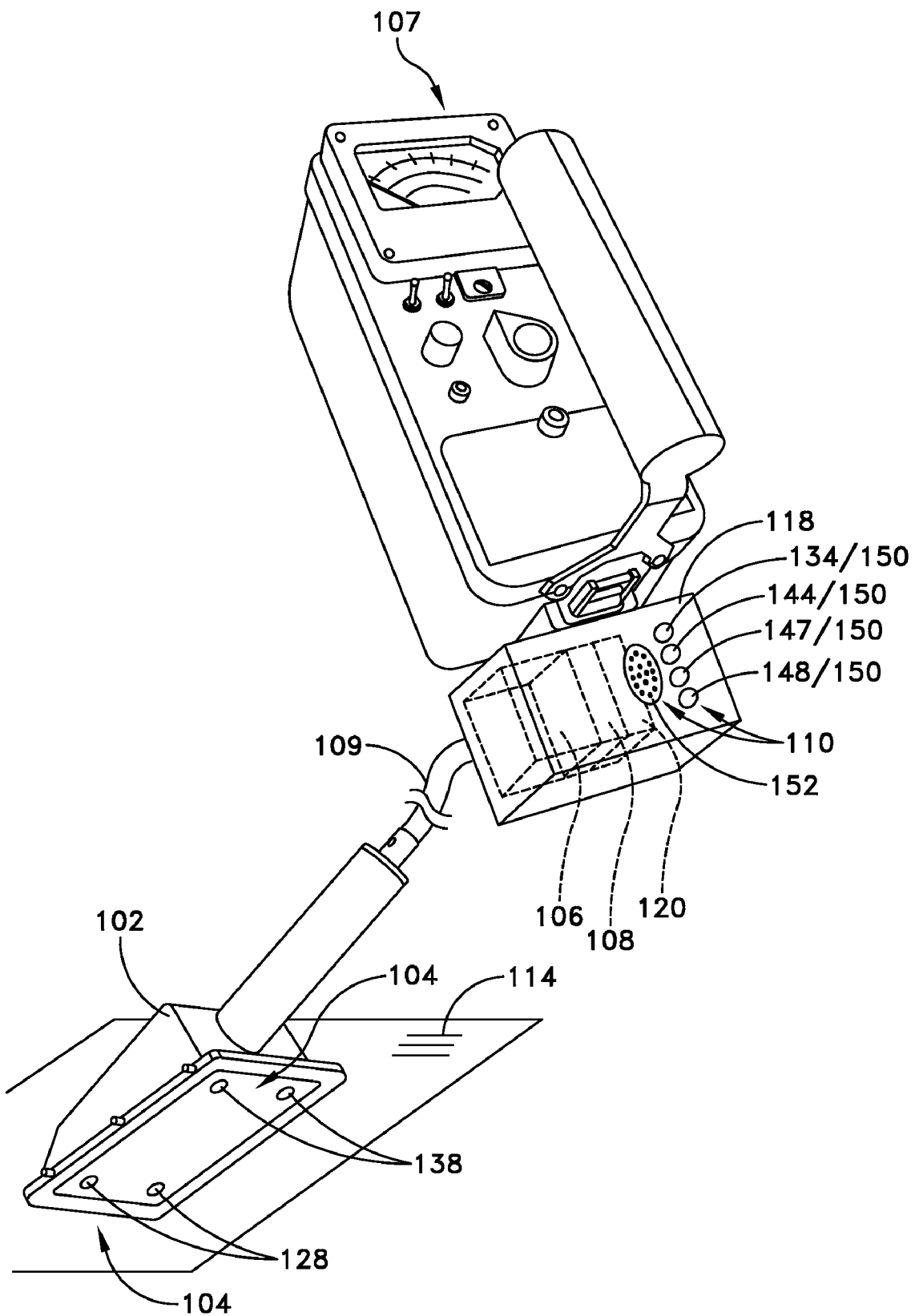
FIG. 4 illustrates yet another embodiment of a monitoring system in which the hand-held radiation detection probe also comprises optical sensors and is attached to a separate monitor via a cable.
Figure 5:
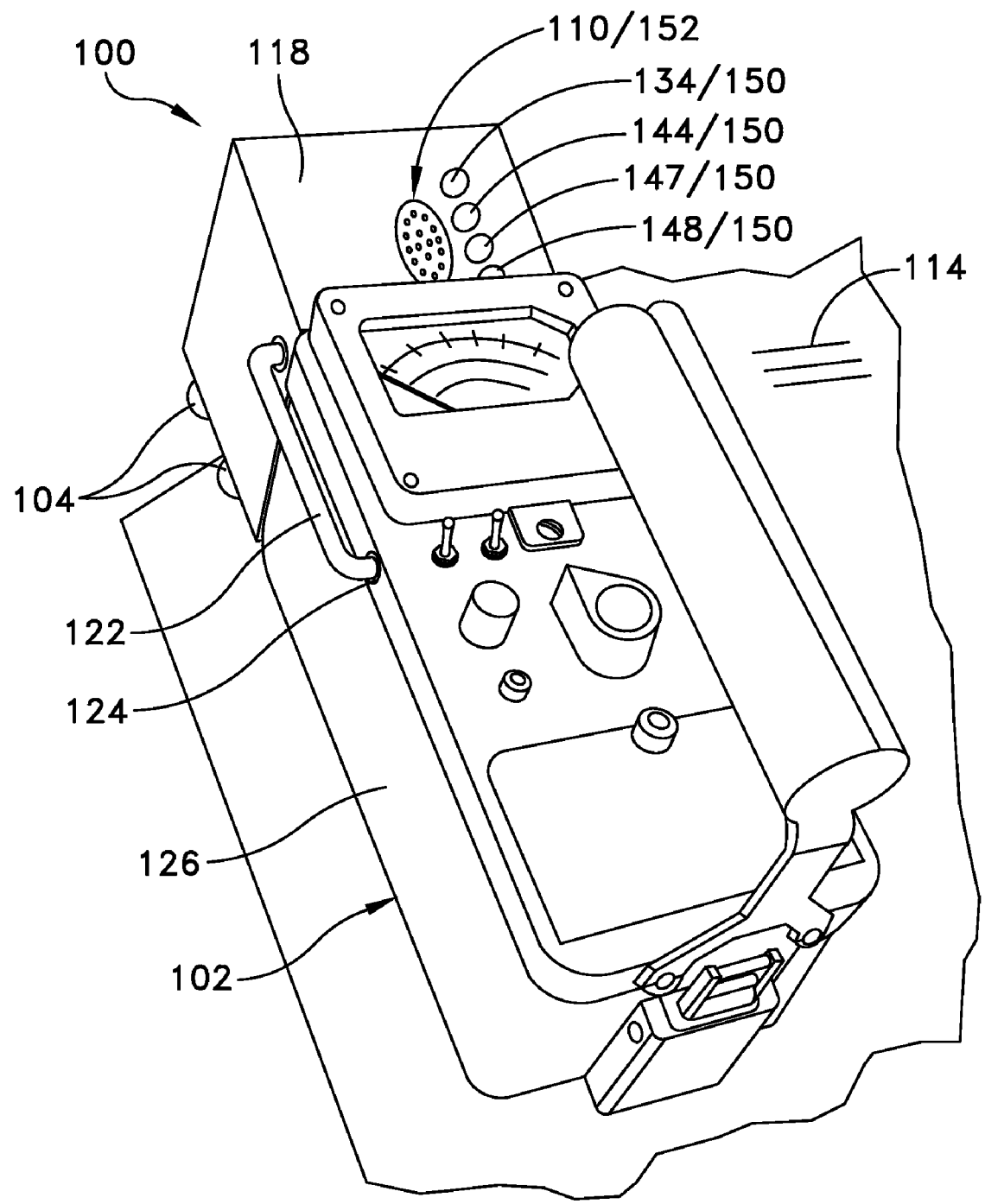
FIG. 5 illustrates another embodiment of a monitoring system for providing operational feedback to a user of a hand-held radiation detection probe in which a housing is mounted to a forward portion of a survey probe, and the system is powered by an electrical connection to a power source of the survey probe.

In another embodiment shown in FIG. 4, hand-held radiation detection probe 102 comprises not only a radiation detector, but also an optical movement sensor 128 and an optical range sensor 138. Hand-held radiation detection probe 102 may be connected to a separate monitor 107 (including housing 118) via cable 109. Thus, the user may be able to survey surface 114 when surface 114 is not in the same location as monitor 107 and housing 118. As is explained in additional detail below, monitor 107 may provide feedback related to probe speed and survey rate, distance between hand-held radiation detection probe 102 and surface 114, and any contact between hand-held radiation detection probe 102 and surface 114. This feedback may include a visual cue, or an audible cue, or a combination of visual and audible cues to the operator. Monitor 107 may alert the operator when pre-programmed parameters 116 (see FIG. 7) are exceeded with respect to survey velocity and probe distance. Monitor 107 may also alert the operator when the hand-held radiation detection probe 102 approaches surface 114. The monitor 107 may provide benefits for training purposes and during regular operation. During training, the monitor 107 may provide immediate feedback for trainees on the proper "frisking" speed and distance from the surface 114. As such, the trainees do not have to guess and make assumptions about the proper frisking speed or distance.

Referring back now to FIG. 1, a battery power source 120, as shown by dashed lines, may be provided within housing 118. Battery power source 120 may be electrically connected to optical sensor 104, microprocessor 106, and indicator device 110.

FIG. 5 illustrates an embodiment in which optical sensor 104, microprocessor 106, and indicator device 110 may each include an electrical connection 122 to a power source 124 of hand-held radiation detection probe 102.

Figure 6:
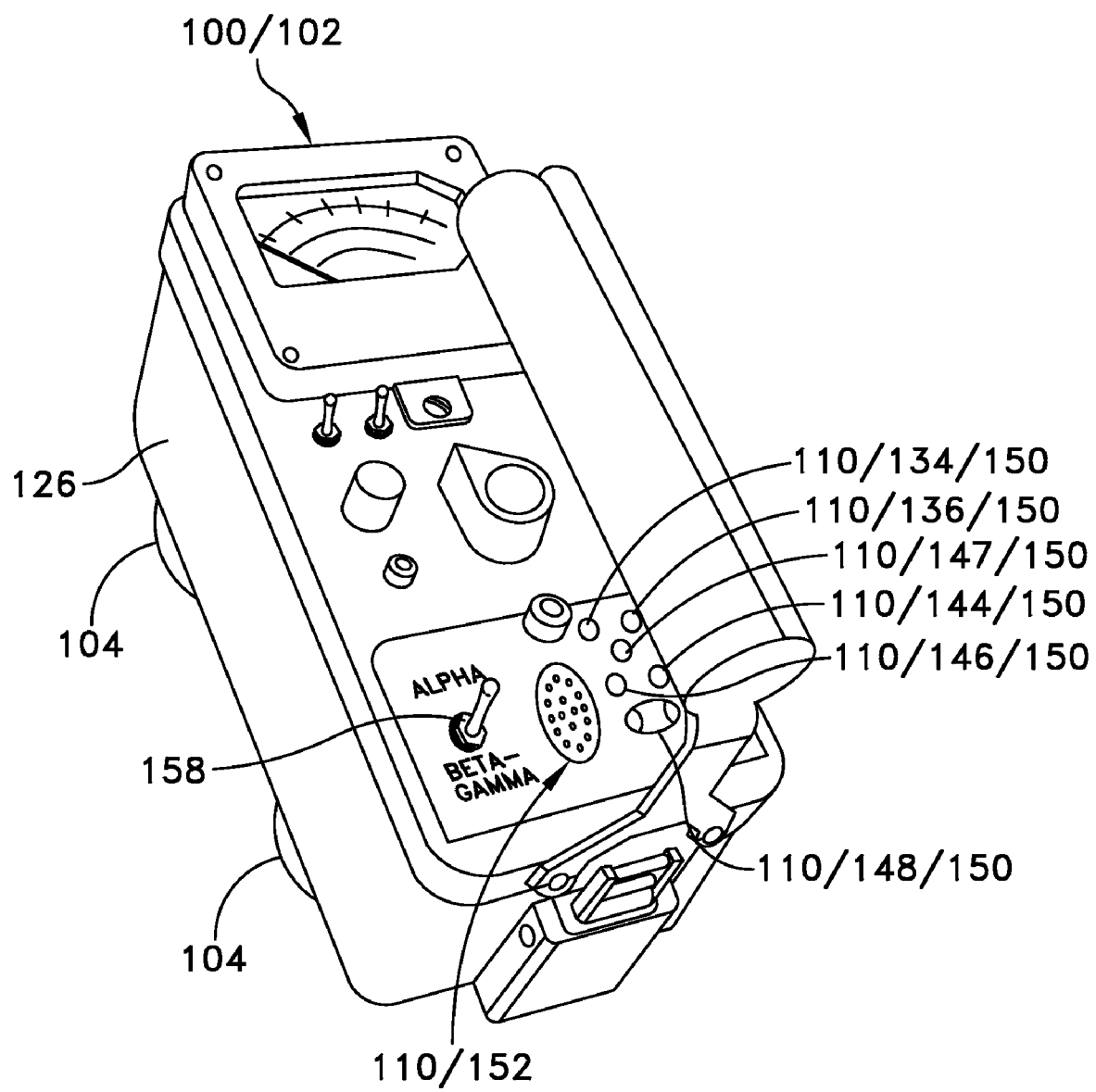
FIG. 6 illustrates an embodiment of an integrated, self-contained hand-held radiation detection probe with a monitoring system for providing operational feedback to a user.

FIG. 6 illustrates yet another embodiment in which optical sensor 104, microprocessor 106, code 108, and indicator device 110 may be integral with a housing 126 of hand-held radiation detection probe 102. In this embodiment, optical sensor 104 and indicator device 110 may comprise the only externally visible difference between integrated, self-contained hand-held radiation detection probe 102 and other survey probes.

Referring again to FIG. 3, in the embodiment shown, optical sensor 104 may include optical movement sensor 128. Thus, output data 112 from optical sensor 104 may comprise a rate of movement of optical movement sensor 128 with respect to surface 114.

Figure 7:
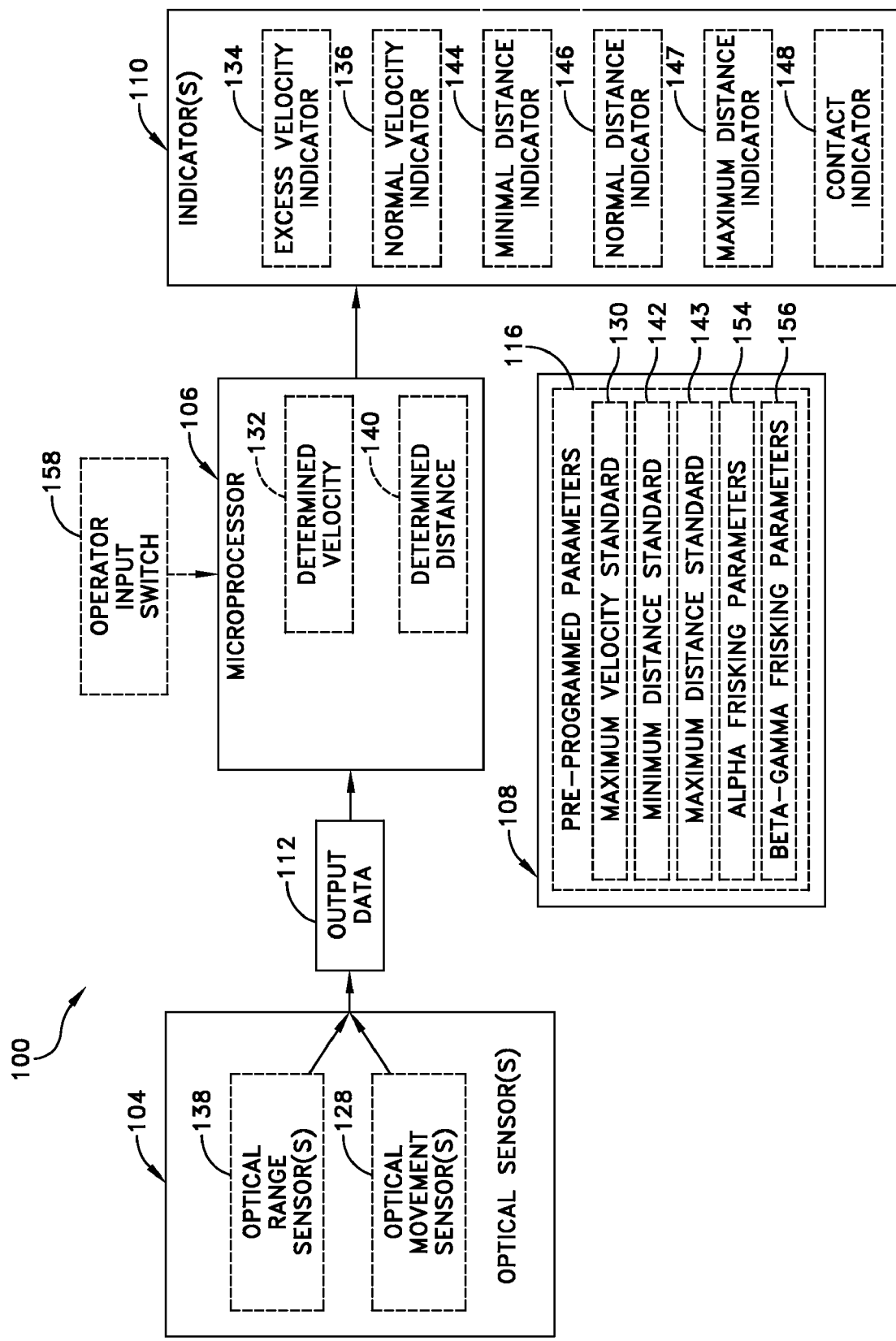
FIG. 7 is a schematic diagram of a monitoring system for providing feedback to a user of a hand-held survey probe.

As illustrated in FIG. 7, pre-programmed parameters 116 for proper use of hand-held radiation detection probe 102 may include a maximum velocity standard 130 for hand-held radiation detection probe 102 with respect to surface 114. Code 108 may be configured to determine a velocity of hand-held radiation detection probe 102 output data 112 the velocity being a determined velocity 132. Comparing output data 112 to pre-programmed parameters 116 may include comparing determined velocity 132 of hand-held radiation detection probe 102 to maximum velocity standard 130. Pre-programmed parameters 116 may also include a minimum velocity standard. Pre-programmed parameters 116 may include any other standards as would be familiar to one of ordinary skill in the art after becoming familiar with the monitoring system 100 of the present invention.

As illustrated in FIGS. 6 and 7, for example, indicator device 110 may include an excess velocity indicator 134 for indicating, or registering, when determined velocity 132 of hand-held radiation detection probe 102 exceeds maximum velocity standard 130. Indicator device 110 may also include a normal velocity indicator 136 for indicating when determined velocity 132 of hand-held radiation detection probe 102 is within maximum velocity standard 130. In another embodiment, normal velocity indicator 136 may also indicate when determined velocity 132 of hand-held radiation detection probe 102 is between maximum velocity standard 130 and the minimum velocity standard.

Optical sensor 104 may include optical range sensor 138. Optional range sensor 138 may be used together with or separate from optical movement sensor 128. Output data 112 may comprise a distance from the hand-held radiation detection probe 102 to the surface 114 as determined by optical range sensor 138, the distance being a determined distance 140. Pre-programmed parameters 116 for proper use of hand-held radiation detection probe 102 may include a minimum distance standard 142 or a maximum distance standard 143 between hand-held radiation detection probe 102 and surface 114, or both. Code 108 may be configured to ascertain the determined distance 140 of hand-held radiation detection probe 102 from output data 112. Comparing output data 112 to pre-programmed parameters 116 may include comparing determined distance 140 of hand-held radiation detection probe 102 to minimum distance standard 142, or maximum distance standard 143, or both.

Indicator device 110 may include a minimal distance indicator 144 for indicating, or registering, when determined distance 140 of hand-held radiation detection probe 102 is below minimum distance standard 142. Indicator device 110 may also include a normal distance indicator 146 for indicating when determined distance 140 of hand-held radiation detection probe 102 is above minimum distance standard 142, or below maximum distance standard 143, or between minimum distance standard 142 and maximum distance standard 143. Indicator device 110 may also include a maximum distance indicator 147 for indicating when determined distance 140 exceeds maximum distance standard 143.

In an embodiment, code 108 may be configured to determine from output data 112 contact between surface 114 and hand-held radiation detection probe 102. Indicator device 110 may include a contact indicator 148 for indicating when code 108 determines contact with surface 114 by hand-held radiation detection probe 102. Indicator device 110 may include a visual cue, such as LED 150, for example. In addition to, or as an alternative to the visual cue, indicator device 110 may include an audible cue, such as audible beeper 152. Other types of visual and audible cues may also be employed as would be recognized by one of ordinary skill in the art.

In an embodiment shown in FIG. 7, pre-programmed parameters 116 may be configured with frisking parameters 154 for a first type of frisking (e.g., frisking for alpha radiation). In another embodiment, pre-programmed parameters 116 may be configured with frisking parameters 156 for a second type of frisking (e.g., frisking for beta-gamma radiation).

For a multi-programmed device, pre-programmed parameters 116 may include a first set of frisking parameters 154 for the first type of frisking (e.g., frisking for alpha radiation) and a second set of frisking parameters 156 for the second type of frisking (e.g., frisking for beta-gamma radiation). A selector 158 may be provided to provide operator switch input between the first set of alpha frisking parameters 154 and the second set of beta-gamma frisking parameters 156. Selector 158 may be configured for manual operation by the user to switch between the first set of alpha frisking parameters 154 and the second set of beta-gamma frisking parameters 156. Alternatively, selector 158 may be configured for automatic operation by microprocessor 106. Selector 158 may be configured for switching to the first set of alpha frisking parameters 154 based on detected alpha radiation. Selector 158 may be configured for switching to the second set of beta-gamma frisking parameters 156 based on detected beta radiation or detected gamma radiation.

Figure 7A:
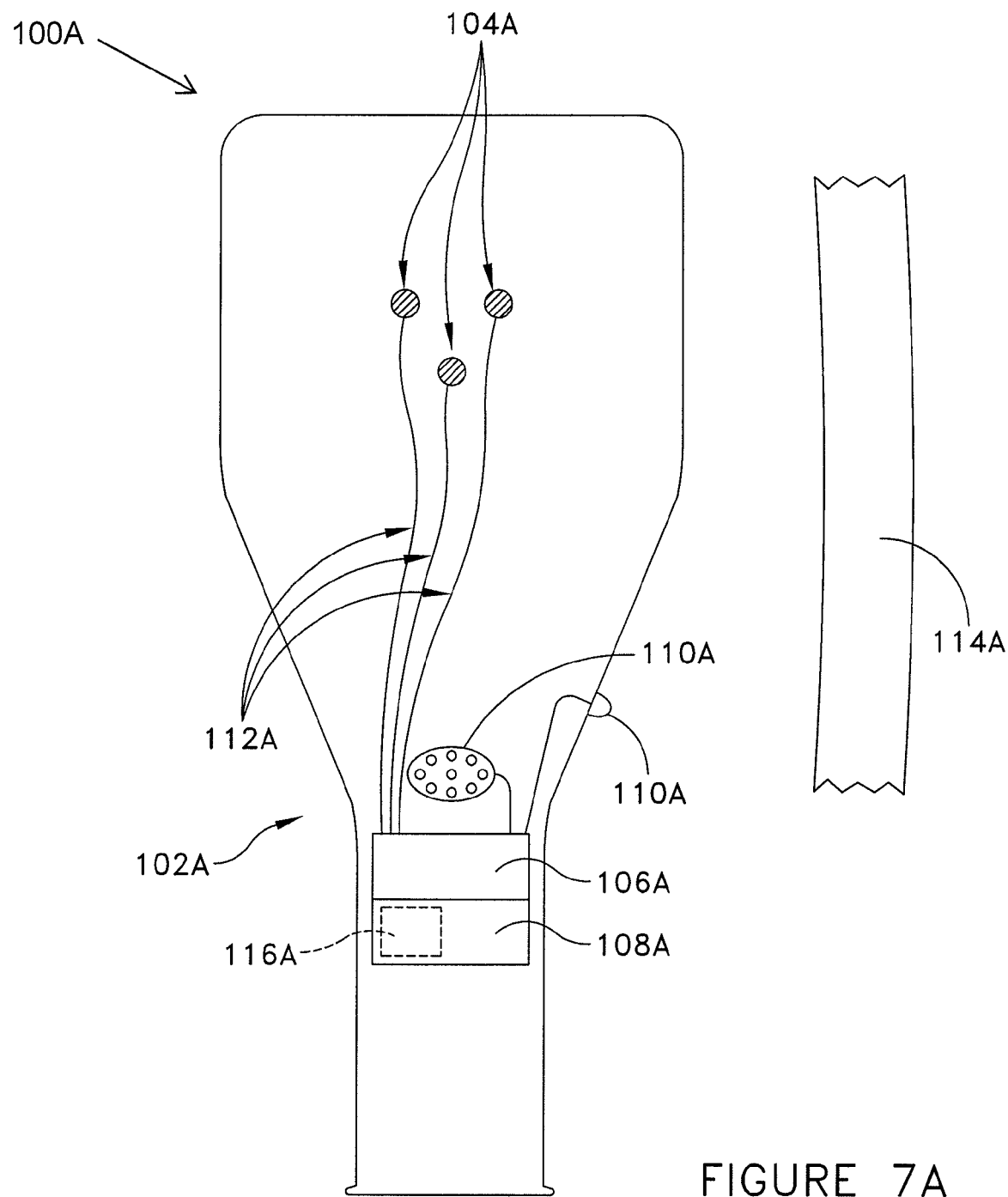
FIG. 7A illustrates a monitoring system integrated within a hand-held detection probe.

FIG. 7A shows a schematic illustration of a monitoring system 100A integrated within a hand-held detection probe 102A. In an embodiment, monitoring system 100A may include an optical sensor 104A, a microprocessor 106A, a software medium having code 108A, and an indicator device 110A. Monitoring system 100A may be configured for use in various types of survey devices such as metal detecting wands.

Optical sensor 104A may be configured to generate output data 112A corresponding to a position of hand-held detection probe 102A with respect to a surface 114A. Microprocessor 106A may communicate with optical sensor 104A. Microprocessor 106A may be configured to receive output data 112A corresponding to the position of hand-held detection probe 102A with respect to surface 114A.

Code 108A may be configured to process output data 112A with microprocessor 106A. Code 108A may have pre-programmed parameters 116A, as shown by dashed lines, for proper use of hand-held detection probe 102A, for example. Code 108A may be configured to compare output data 112A to pre-programmed parameters 116A.

Indicator device 110A may communicate with microprocessor 106A. Indicator device 110A may be configured to indicate at least one result from comparing output data 112A to pre-programmed parameters 116A.

Figure 8:
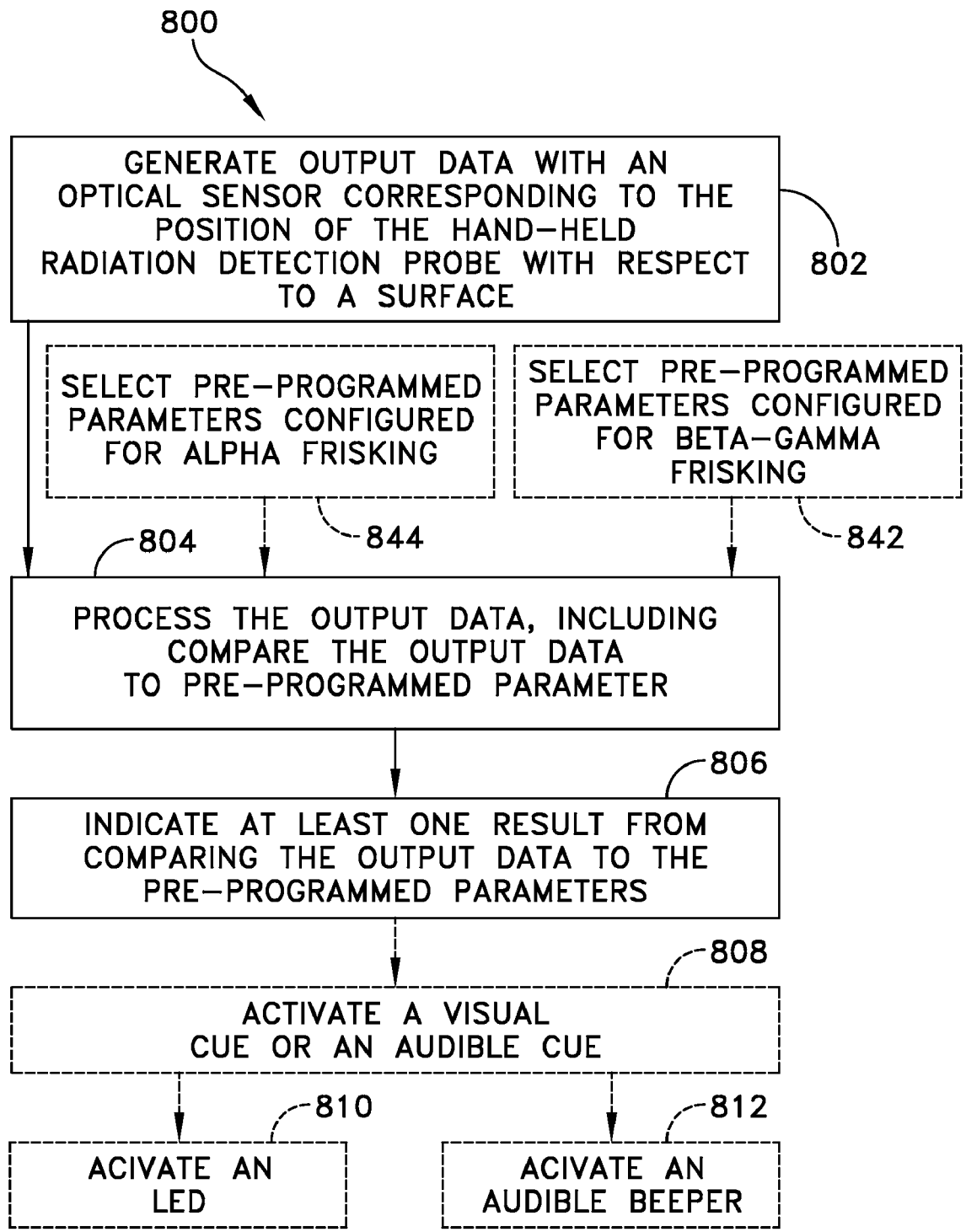
FIG. 8 illustrates a diagram of a method for providing operational feedback to a user of a hand-held radiation detection probe.

FIG. 8 shows a method 800 of providing operational feedback to a user of hand-held radiation detection probe 102. In one embodiment, method 800 may include generating 802 output data 112 with an optical sensor 104, wherein the output data 112 may correspond to the position of the hand-held radiation detection probe 102 with respect to surface 114. Method 800 may also include processing 804 the output data 112, including comparing the output data 112 to pre-programmed parameters 116 for use of the hand-held radiation detection probe 102. Method 800 may further include indicating 806 a result from comparing the output data 112 to the pre-programmed parameters 116.

Optionally, indicating 806 the result from comparing the output data 112 to the pre-programmed parameters 116 may include activating 808 a visual cue or an audible cue. Activating 808 the visual cue or the audible cue may occur when comparing the output data 112 to the pre-programmed parameters 116 discloses that the output data 112 is outside of normal or established operating conditions. Activating 808 the visual cue and the audible cue may occur when comparing the output data 112 to the pre-programmed parameters 116 discloses that the output data 116 is within normal or established operating conditions.

Activating 808 the visual cue may include activating 810 LED 150. Activating 808 the audible cue may include activating 812 audible beeper 152.

Figure 9:
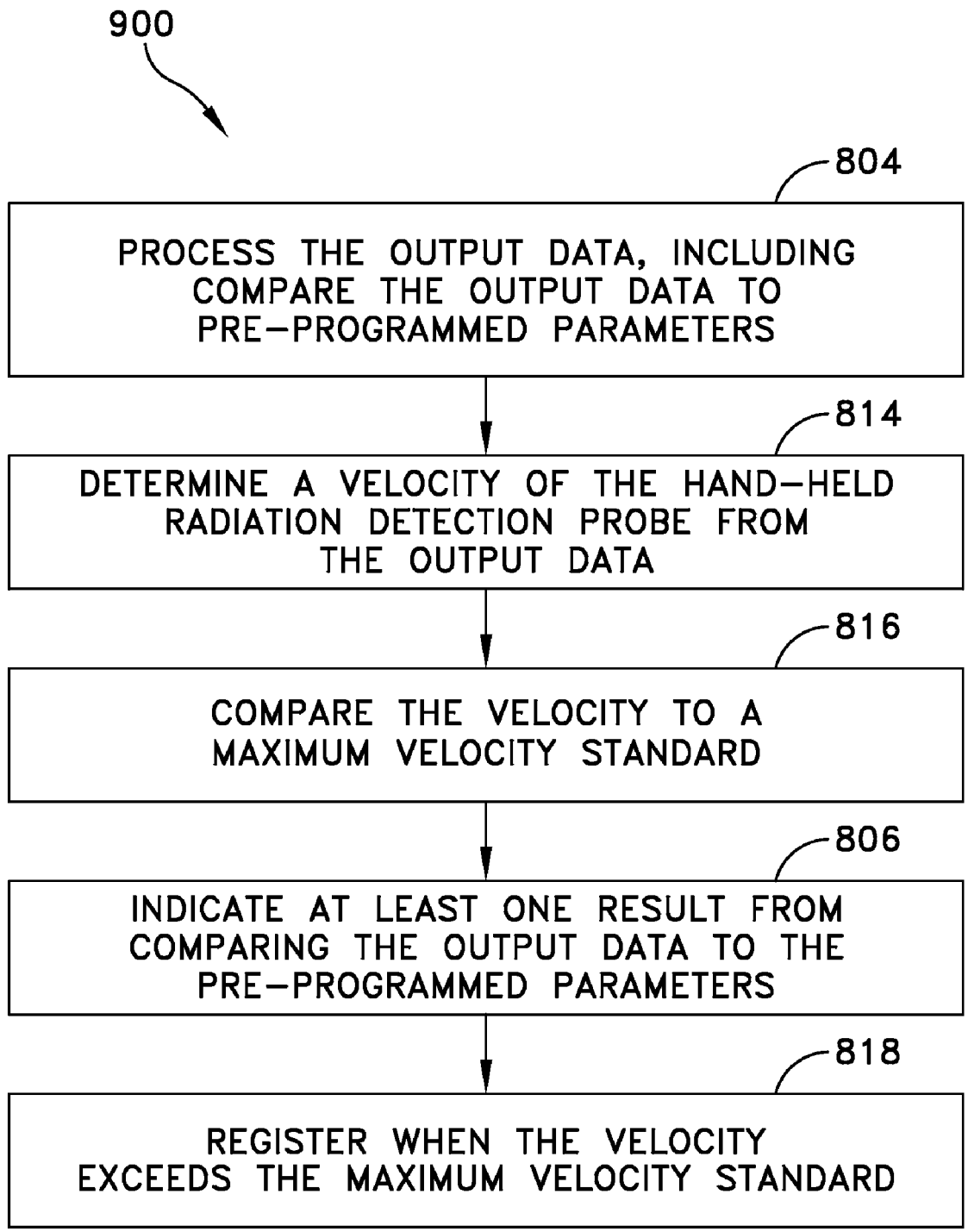
FIGS. 9-13 illustrate several alternative embodiments of the method shown in the diagram of FIG. 8.

In an embodiment of method 900 shown in FIG. 9, processing 804 the output data 112, including comparing the output data 112 to pre-programmed parameters 116, may include determining 814 from the output data 112 the determined velocity 132 of the hand-held radiation detection probe 102, and comparing 816 the determined velocity 132 of the hand-held radiation detection probe 102 to a maximum velocity standard 130. Indicating 806 the result from comparing the output data 112 to the pre-programmed parameters 116 may include registering 818 when the determined velocity 132 of the hand-held radiation detection probe 102 exceeds the maximum velocity standard 130.

Figure 10:
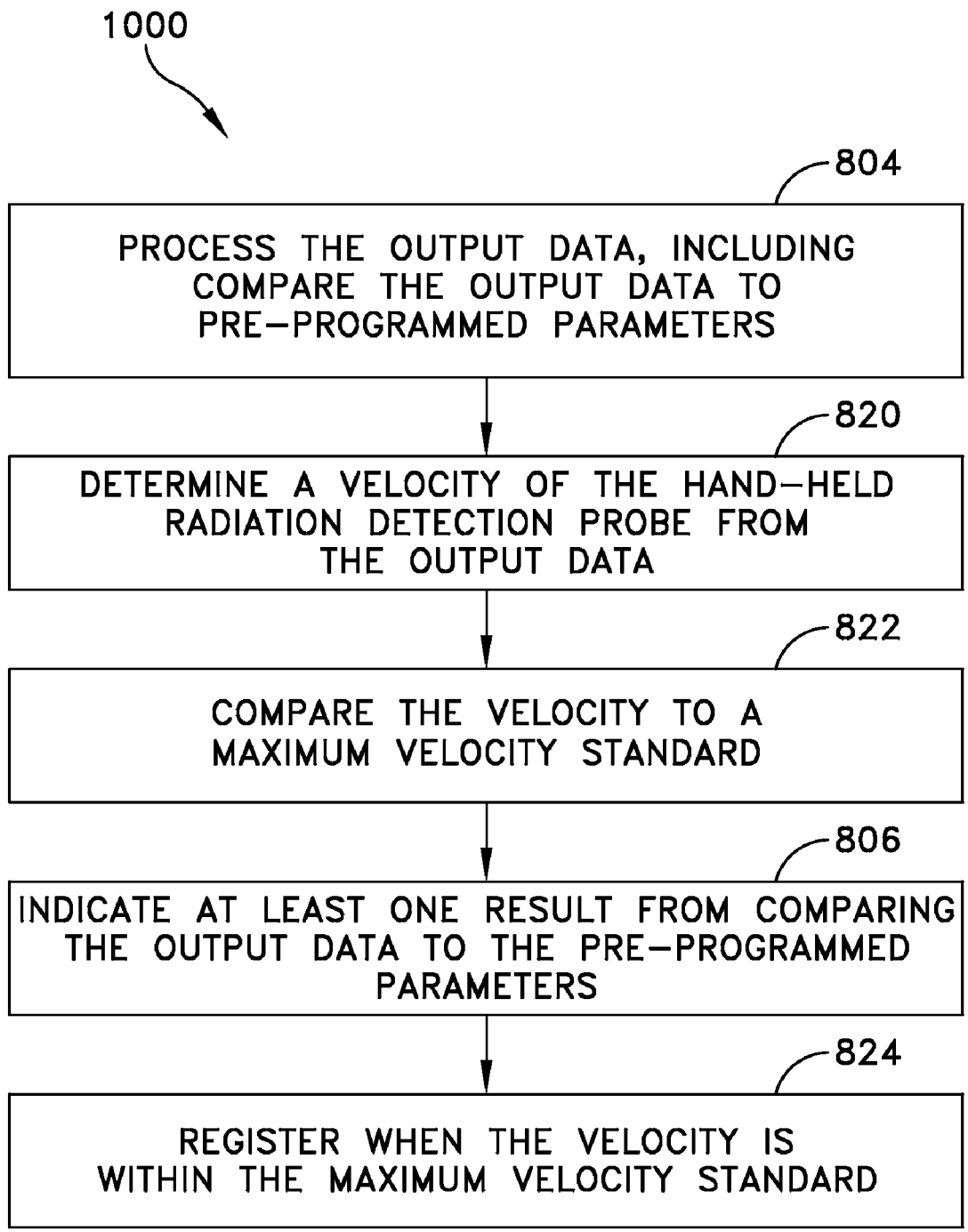

FIG. 10 illustrates yet another embodiment of method 1000 in which processing 804 the output data 112, including comparing the output data 112 to pre-programmed parameters 116, may include determining 820 the determined velocity 132 of the hand-held radiation detection probe 102 from the output data 112, and comparing 822 the determined velocity 132 of the hand-held radiation detection probe 102 to the maximum velocity standard 130. Indicating 806 the result from comparing the output data 112 (e.g., the determined velocity 132) to the pre-programmed parameters 116 may include registering 824 when the determined velocity 132 of the hand-held radiation detection probe 102 is within the maximum velocity standard 130. In still other embodiments, indicating 806 the result may include registering when the determined velocity 132 is below the minimum velocity standard, or between the minimum velocity standard and the maximum velocity standard 132.

Figure 11:
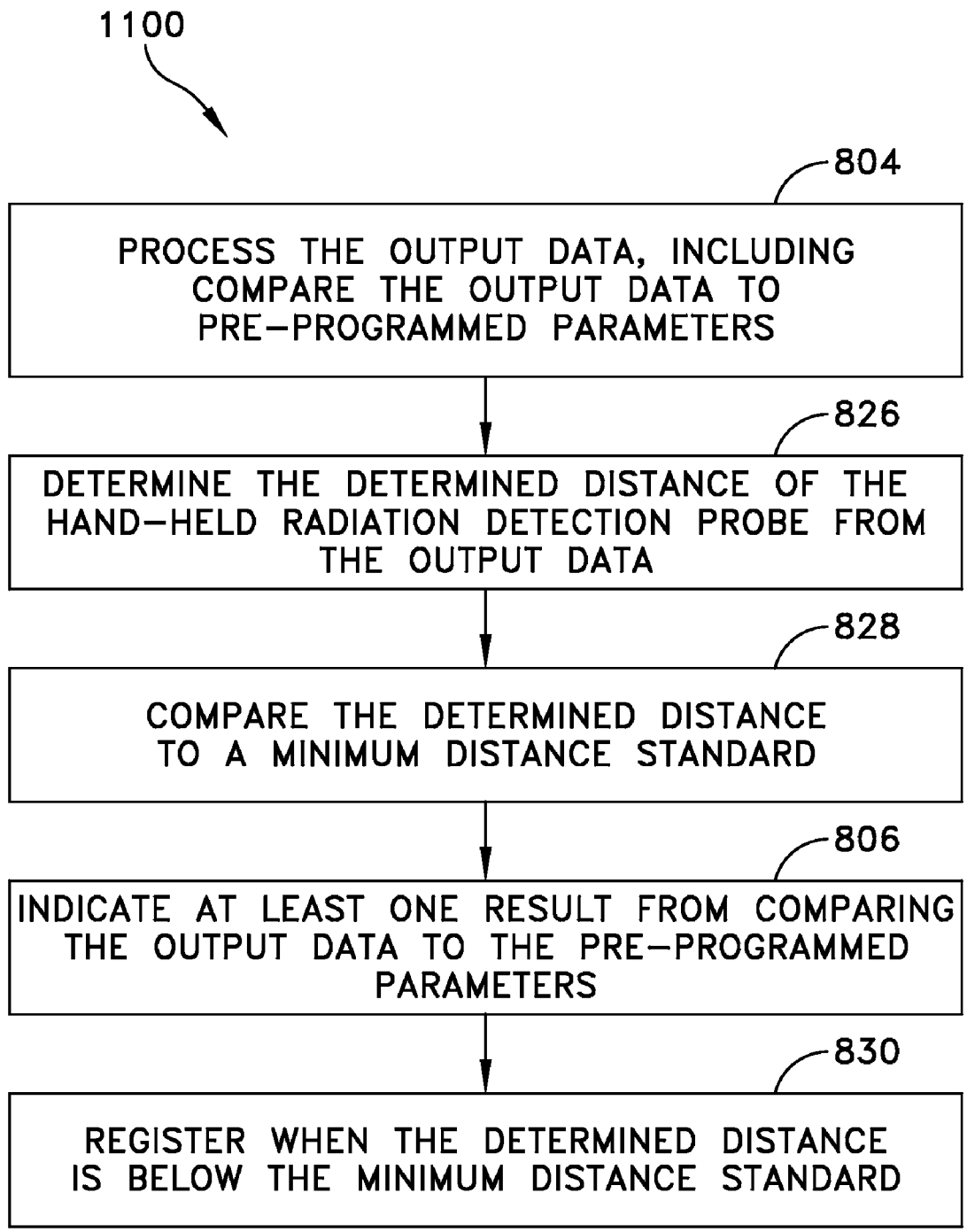

With reference to FIG. 11, method 1100 comprises processing 804 the output data 112, including comparing the output data 112 to pre-programmed parameters 116. Method 1100 may include determining 826 the determined distance 140 between the hand-held radiation detection probe 102 and the surface 114 using the output data 112, and comparing 828 the determined distance 140 to a minimum distance standard 142. Indicating 806 the result from comparing the output data 112 to the pre-programmed parameters 116 may include registering 830 when the determined distance 140 between the hand-held radiation detection probe 102 and the surface 114 is below the minimum distance standard 142.

Figure 12:
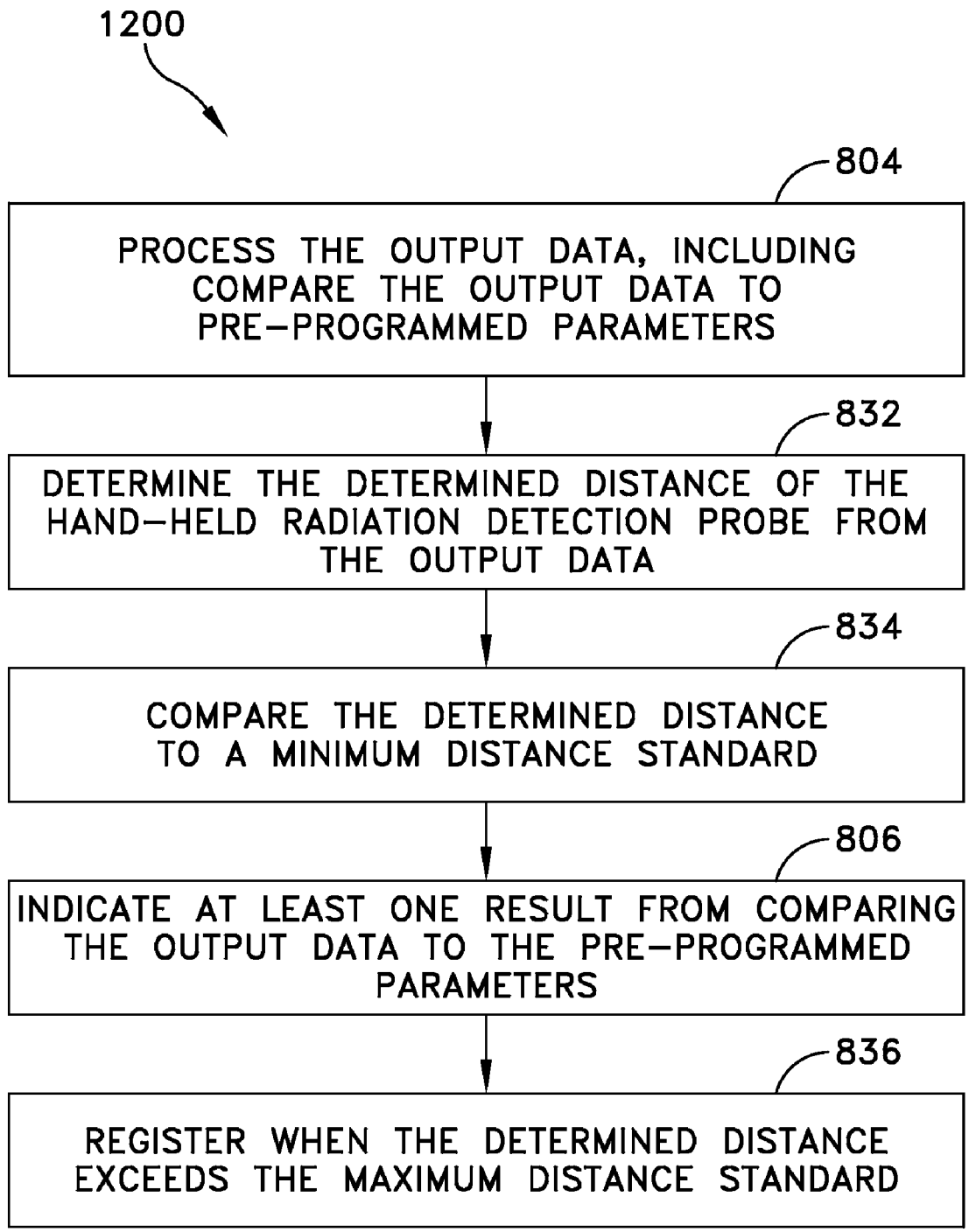

Method 1200, shown in FIG. 12, comprises processing 804 the output data 112, including comparing the output data 112 to pre-programmed parameters 116. Method 1200 may include determining 832 the determined distance 140 between the hand-held radiation detection probe 102 and the surface 114 from the output data 112, and comparing 834 the determined distance 140 to a minimum distance standard 142. Indicating 806 the result from comparing the output data 112 to the pre-programmed parameters 116 may include registering 836 when the determined distance 140 exceeds the maximum distance standard 143.

In yet another embodiment, indicating 806 the result from comparing the output data 112 to the pre-programmed parameters 116 may include registering when the determined distance 140 is above the minimum distance standard 142, is below the maximum distance standard 143, or falls between the minimum distance standard 142 and the maximum distance standard 143.

Figure 13:
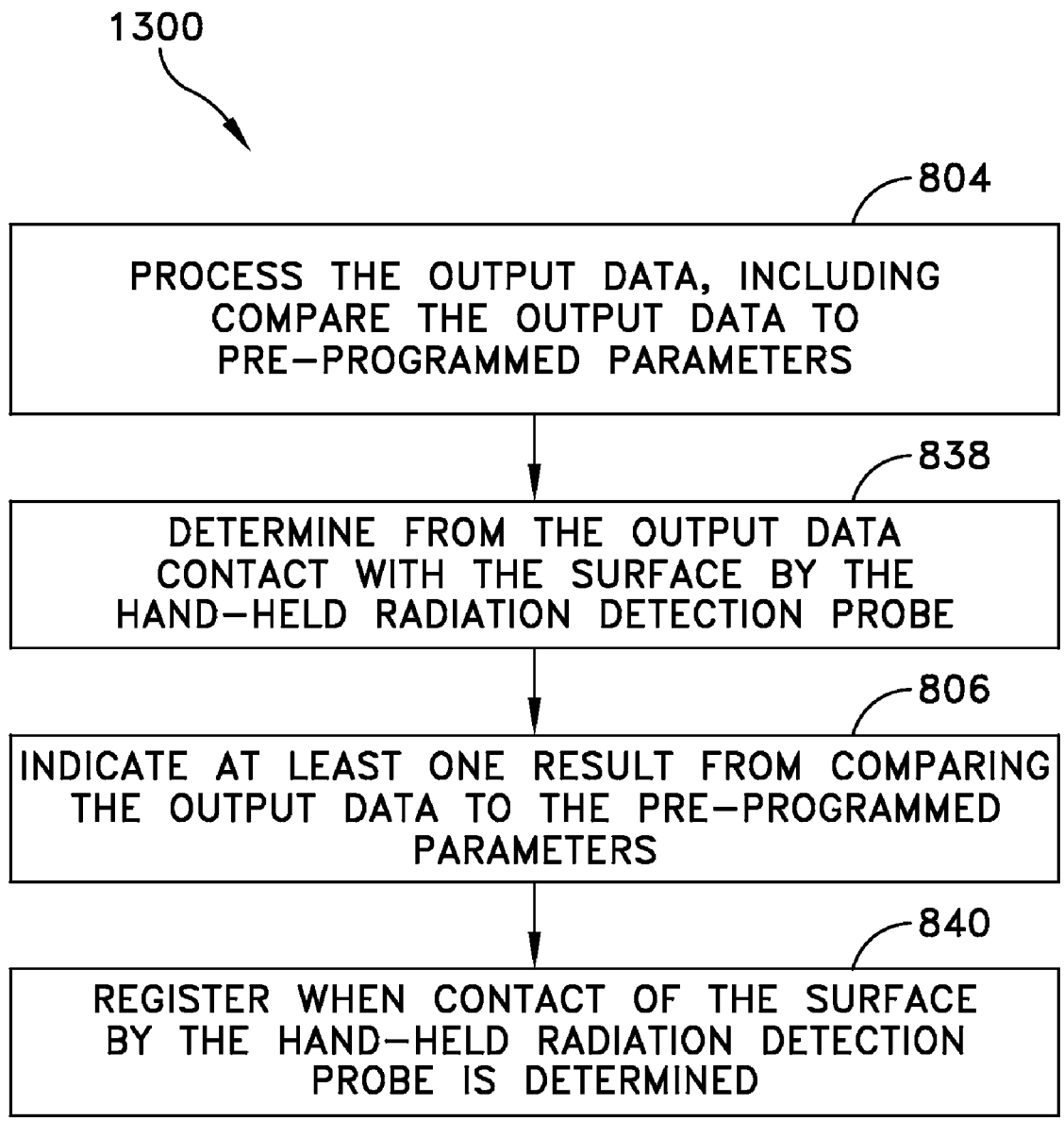

Method 1300, shown in FIG. 13, comprises processing 804 the output data 112, including comparing the output data 112 to pre-programmed parameters 116. Method 1300 may include determining 838 from the output data 112 whether the surface 114 has been contacted by the hand-held radiation detection probe 102. Indicating 806 the result from comparing the output data 112 to the pre-programmed parameters 116 may include registering 840 when contact of the surface 114 by the hand-held radiation detection probe 102 is determined.

As shown in FIG. 8, method 800 may further include selecting 844 pre-programmed parameters 116 configured for alpha frisking prior to processing 804 the output data 112. Method 800 may further include selecting 842 pre-programmed parameters 116 configured for beta-gamma frisking prior to processing 804 the output data 112.

During use by a radiation worker or by an emergency responder, the novel monitoring system 100, 100A may increase the level of safety by helping operators avoid errors associated with moving the probe too quickly and holding the probe too far away from the surface while surveying themselves or others for radioactive contamination.

The monitoring system 100, 100A may eliminate or reduce the "grey area" between proper survey practices and the improper practice of "turbo-frisking" (i.e., moving the probe too fast). The monitoring system 100, 100A may be used as a training aid to teach proper probe speed and distance-from-surface while surveying for radioactive contamination, for example. In an embodiment, the monitoring system 100 may be retrofitted, e.g., attached, to existing radiation detection probes for training and actual survey use. In another embodiment, the monitoring system 100, 100A may be integrated directly into the probe head of a survey meter. The monitoring system 100, 100A may be configured for generally any "frisking" application where the speed and distance from the surface of a hand-held item is desired for measurement or operation.

The monitoring system 100, 100A may include optical sensing technology, simple microprocessor and LED/audible output combined with custom software to continuously monitor proper "frisk" rate and distance from surface. If measurements exceed the pre-programmed values for proper frisking, the operator may be alerted by LED or beeper, or both, which allows for immediate correction of technique. The monitoring system 100 may be configured for operator selection between alpha frisking and beta-gamma frisking, for example, and the device will provide proper rate and surface distance feedback. The monitoring system 100, 100A may be configured for use with custom software to continuously monitor proper frisk rate and distance from surface.

Having herein set forth preferred embodiments of the present invention, it is anticipated that suitable modifications can be made thereto, which will nonetheless remain within the scope of the invention. The invention shall, therefore, only be construed in accordance with the following claims.

The invention claimed is:

1. A monitoring system for providing operational feedback to a user of a detection probe, the monitoring system comprising:
    an optical sensor attachable to a detection probe, the optical sensor configured to generate output data corresponding to at least one of a rate movement of the detection probe with respect to a surface and a distance between the detection probe and the surface;
    a microprocessor in communication with the optical sensor and configured to receive the output data generated by the optical sensor;
    a software medium comprising a code to process the output data with the microprocessor and to compare the output data to at least one pre-programmed parameter, wherein the at least one pre-programmed parameter comprises at least one of a maximum velocity standard, a minimum distance standard, and a maximum distance standard; and
    an indicator device in communication with the microprocessor and configured to indicate a result of the comparison of the output data to the at least one pre-programmed parameter.

2. the monitoring system of claim, further comprising a housing containing the optical sensor, the microprocessor, the software medium, and the indicator device, and wherein the housing is attached to the detection probe.

3. The monitoring system of claim 2, further comprising a battery within the housing, wherein the battery is electrically connected to the optical sensor, the microprocessor, and the indicator device.

4. The monitoring system of claim 1, further comprising a power source electrically connected to the optical sensor, the microprocessor, and the indicator device.

5. The monitoring system of claim 1, further comprising a housing, wherein the optical sensor, the microprocessor, the software medium, and the indicator device are integral with the housing.

6. The monitoring system of claim 1, wherein the optical sensor includes an optical movement sensor configured to detect the rate of movement of the detection probe with respect to the surface, and wherein the output data corresponds to the rate of movement.

7. The monitoring system of claim 6, wherein:
the at least one pre-programmed parameter includes the maximum velocity standard; and
the code is configured to process the output data with the microprocessor to determine a velocity of the detection probe from the rate of movement, and to compare the velocity the comparison includes to the maximum velocity standard.

8. The monitoring system of claim 7, wherein the indicator device includes an excess velocity indicator.

9. The monitoring system of claim 7, wherein the indicator device includes a normal velocity indicator.

10. The monitoring system of claim 1, wherein the optical sensor includes an optical range sensor configured to detect a range of distance between the optical range sensor and the surface, and wherein the output data corresponds to the distance.

11. The monitoring system of claim 10, wherein:
the at least one pre-programmed parameter includes the minimum distance standard; and
the code is configured to process the output data with the microprocessor to determine the distance from the output data, and to compare the distance to the minimum distance standard.

12. The monitoring system of claim 11, wherein the indicator device includes a minimum distance indicator.

13. The monitoring system of claim 11, wherein the indicator device includes a normal distance indicator.

14. The monitoring system of claim 10, wherein:
the at least one pre-programmed parameter includes the maximum distance standard; and
the code is configured to process the output data with the microprocessor to determine the distance from the output data, and to compare the distance to the maximum distance standard.

15. The monitoring system of claim 14, wherein the indicator device includes a maximum distance indicator.

16. The monitoring system of claim 1, wherein the code is configured to process the output data with the microprocessor to determine whether the surface is contacted by the detection probe.

17. The monitoring system of claim 16, wherein the indicator device includes a contact indicator.

18. The monitoring system of claim 1, wherein the indicator device includes a visual cue.

19. The monitoring system of claim 18, wherein the visual cue includes an LED.

20. The monitoring system of claim 1, wherein the indicator device includes an audible cue.

21. The monitoring system of claim 20, wherein the audible cue includes a beeper.

22. The monitoring system of claim 1, wherein the at least one pre-programmed parameter is configured for a first type of frisking.

23. The monitoring system of claim 22, wherein the at least one pre-programmed parameter is configured for a second type of frisking.

24. The monitoring system of claim 23, wherein:
the at least one pre-programmed parameter includes a first set and a second set, the first set being configured for the first type of frisking, and the second set of the at least one pre-programmed parameter being configured for the second type of frisking; and
further comprising a selector to switch between the first set and the second set.

25. The monitoring system of claim 24, wherein the selector is configured for manual operation.

26. The monitoring system of claim 24, wherein the selector is configured for automatic operation by the microprocessor.

27. An apparatus, comprising:
a hand-held radiation detection probe;
an optical sensor operatively associated with the hand-held radiation detection probe, the optical sensor being configured to generate output data corresponding to at least one of a rate of movement of the hand-held detection probe with respect to a surface and a distance between the hand-held detection probe and the surface;
a microprocessor in communication with the optical sensor and configured to receive the output data;
a software medium having code to process the output data with the microprocessor and to compare the output data to one or more pre-programmed parameters, wherein the one or more pre-programmed parameters comprise at least one of a maximum velocity standard, a minimum distance standard, and a maximum distance standard; and
an indicator device in communication with the microprocessor and configured to indicate a result of the comparison of the output data to the one or more pre-programmed parameters.

28. A method of providing operational feedback to a user of a detection probe, comprising:
generating output data with an optical sensor, the output data corresponding to a position of a detection probe with respect to a surface;
processing the output data using a microprocessor, comprising:
determining and storing from the output at least one of a velocity of the detection probe with respect to the surface and a distance of the detection probe from the surface; and
comparing the at least one of the velocity and the distance to the one or more pre-programmed parameters, wherein the one or more pre-programmed parameters comprises at least one of a maximum velocity standard, a minimum distance standard, and a maximum distance standard; and
indicating a result from comparing the output data to the one or more pre-programmed parameters.

29. The method of claim 28, wherein indicating a result includes activating at least one of a visual cue and an audible cue.

30. The method of claim 29, wherein activating at least one of a visual cue and an audible cue occurs when the result discloses that the output data falls outside of the one or more pre-programmed parameters.

31. The method of claim 29, wherein activating at least one of a visual cue and an audible cue occurs when the result discloses that the output data is within the one or more pre-programmed parameters.

32. The method of claim 29, wherein activating at least one of a visual cue and an audible cue includes activating an LED.

33. The method of claim 29, wherein activating at least one of a visual cue and an audible cue includes activating a beeper.

34. The method of claim 28, wherein processing the output data comprises:
determining the velocity of the detection probe from the output data; and
comparing the velocity to a pre-programmed parameter comprising the maximum velocity standard.

35. The method of claim 34, wherein indicating a result includes indicating a result when the velocity is within the maximum velocity standard.

36. The method of claim 34, wherein indicating a result includes indicating a result when the velocity exceeds the maximum velocity standard.

37. the method of claim 28, wherein processing the output data comprises:
   determining from the output data a distance of the detection probe from the surface; and
   comparing the distance to a pre-programmed parameter comprising a maximum distance standard.

38. The method of claim 37, wherein indicating a result includes indicating a result when the distance exceeds the maximum distance standard.

39. The method of claim 28, wherein:
   processing the output data includes determining from the output data a contact between the surface and the detection probe; and
   indicating a result includes indicting a result when contact between the surface and the detection probe is determined.

40. The method of claim 28, further comprising selecting one or more pre-programmed parameters configured for a first type of frisking.

41. The method of claim 40, further comprising selecting one or more pre-programmed parameters configured for a second type of frisking.

42. The method of claim 28, wherein processing the output data comprises:
   determining from the output data a distance of the detection probe from the surface; and
   comparing the distance to a pre-programmed parameter comprising the minimum distance standard.

43. The method of claim 42, wherein indicating a result includes indicating a result when the distance is below the minimum distance standard.

44. The method of claim 42, wherein indicating a result includes indicating a result when the distance is above the minimum distance standard.

45. The method of claim 42, wherein:
   processing the output data further comprises comparing the distance to a pre-programmed parameter comprising the maximum distance standard; and
   indicating a result comprises indicating a result when the distance is between the minimum distance standard and the maximum distance standard.

* * * * *

UNITED STATES PATENT AND TRADEMARK OFFICE
CERTIFICATE OF CORRECTION

PATENT NO. : 7,667,854 B2  Page 1 of 1
APPLICATION NO. : 11/612023
DATED : February 23, 2010
INVENTOR(S) : Kevin L. Young and Kevin E. Hungate It is certified that error appears in the above-identified patent and that said Letters Patent is hereby corrected as shown below:

In the claims:
CLAIM 1,   COLUMN 8,   LINE 26-27, delete line break after "to" and before "a user of a"
CLAIM 37, COLUMN 11, LINE 4,     change "the method" to --The method--

Signed and Sealed this
Twenty-eighth Day of May, 2013

Teresa Stanek Rea
*Acting Director of the United States Patent and Trademark Office*